United States Patent [19]

Thoma et al.

[11] 3,932,366

[45] Jan. 13, 1976

[54] PROCESS FOR THE PRODUCTION OF BASIC MODIFIED POLYAMIDES

[75] Inventors: Wilhelm Thoma, Berg.Neukirchen; Dietrich Hildebrand, Odenthal; Wolf-Dieter Last; Heinrich Rinke, both of Leverkusen, all of Germany

[73] Assignee: Bayer Aktiengesellschaft, Leverkusen-Bayerwerk, Germany

[22] Filed: Dec. 13, 1974

[21] Appl. No.: 532,671

Related U.S. Application Data

[62] Division of Ser. No. 377,090, July 6, 1973.

[52] U.S. Cl......... 260/78 L; 260/37 N; 260/78 SC; 260/78 TF; 260/78 A; 8/178 R; 57/140 R
[51] Int. Cl.²........................................ C08G 69/48
[58] Field of Search............. 260/78 L, 78 SC, 37 N

[56] References Cited
UNITED STATES PATENTS

| | | |
|---|---|---|
| 3,320,215 | 5/1967 | Conte et al........................ 260/78 L |
| 3,549,601 | 12/1970 | Fowell............................ 260/78 TF |
| 3,687,904 | 8/1972 | Middleton....................... 260/78 TF |

*Primary Examiner*—Lucille M. Phynes
*Attorney, Agent, or Firm*—Plumley & Tyner

[57] ABSTRACT

This invention relates to the production of basic modified polyamides produced by the polycondensation of lactams or ω-aminocarboxylic acids with 0.1 to 5 mol of triamines of the formula

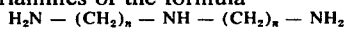

where $n$ equals 2 to 6 per 100 mol of lactam and 2 equivalents of carboxyl groups in the form of dicarboxylic acids and monocarboxylic acids per mol of triamine, using a molar ratio of monocarboxylic acids to dicarboxylic acids of between 10 : 1 and 1 : 20, which polyamides are dyed with reactive dyes.

5 Claims, 1 Drawing Figure

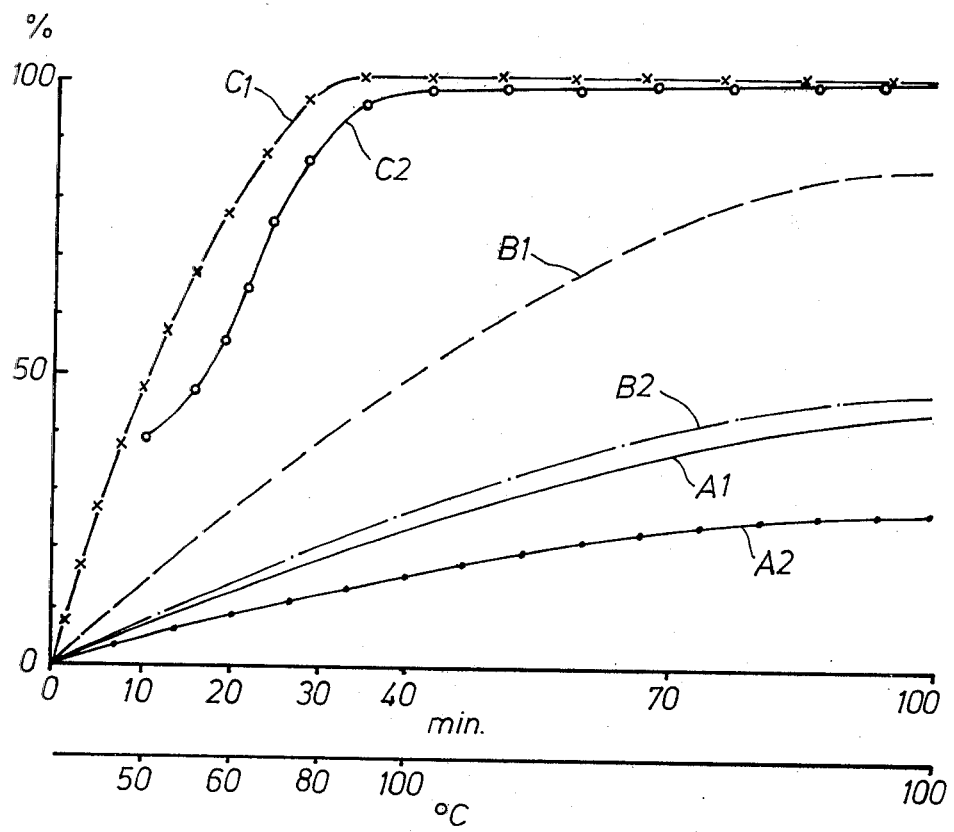

PROCESS FOR THE PRODUCTION OF BASIC MODIFIED POLYAMIDES

This is a Division of application, Ser. No. 377,090, filed July 6, 1973.

This invention relates to a process for the production of basic modified polyamides and threads and fibres made of such polyamides. These threads and fibres can be dyed with reactive dyes to produce deep colours which are fast to light, perspiration, water, boiling washes and detergents.

It is known that polyamides and, in particular polyamides produced from lactams, can be dyed with reactive dyes. Compared with dispersion dyes and acid dyes which are nowadays mainly used for dyeing polyamides, reactive dyes have numerous remarkable advantages which can be attributed to the reaction between the reactive dye groups and the functional groups of the polyamides to form covalent chemical bonds. One particular advantage, for example, is the astonishing improvement in the fastness of the colours obtained by dyeing polyamides with reactive dyes. In their fastness to water, perspiration and abrasion, reactive dyes are distinctly superior to conventional dyes.

The capacity of polyamide fibres to absorb reactive dyes is, however, limited and hence the depth of colour which can be obtained on normal standard polyamides is correspondingly limited and dyeings which have the high fastness to peerspiration, water and boiling washes characteristic of reactive dyes cannot be obtained with more than 2% of reactive dye in the polyamide. The quantity of reactive dye which can be fixed by the fibres is limited by the number of functional end groups in the polyamide and is generally not more than 2%. An additional quantity of dye may occasionally be present in the form of a salt which can easily be removed by washing with alkaline soaps.

It is also known that basic modified polyamides which contain tertiary amino groups in the chain have a higher dye absorption capacity for acid dyes and anionic reactive dyes than polyamides which contain only amino end groups.

If the dye content is more than the average of 2%, however, the fastness to perspiration, water and washing of reactive dyeings on such polyamides which are modified with tertiary amino groups is no better than on polyamides in which the only basic groups are amino end groups because the tertiary amino groups do not react with the reactive group of the reactive dye and therefore it is only the absorption capacity for the dye molecules which are bound as salts which is increased. The fastness to perspiration, water and washing of the reactive dyeings on polyamides which are basic modified with tertiary amino groups is therefore determined solely by the number of amino end groups present.

It is also known that the dye absorption capacity of polyamides can be improved by increasing the number of amino end groups in the polyamides. This can be achieved, for example, by adding free amines to the polyamide-forming starting materials before polycondensation is carried out. The amines used for this purpose may be aliphatic mono- or polyamines or heterocyclic amines. Polyamides with an increased number of functional groups (amino end groups) produced by this method are, however, difficult to spin. If it is attempted to obtain a substantial improvement in the dye absorption by adding a correspondingly larger quantity of amine, then the polyamide mass tends to form drops when attempts are made to spin it, in other words spinning is no longer possible.

According to one known process (Belgian Patent Specification No. 693,000), an appropriate quantity of an aliphatic dicarboxylic acid such as adipic adid or glutaric acid may be added to the polyamide before condensation in addition to the polyamine, the quantity used being 0.3 to 1.1 mol of dicarboxylic acid per mol of polyamine. This method, however, has the disadvantage that cross-linked structures are likely to be formed by the reaction of the dicarboxylic acid with all three amino groups of the polyamine. This is found to be a disadvantage when attempts are subsequently made to produce threads, fibres or films from the resulting polyamides. This formation of cross-linked structures is facilitated by the fact that if polyamines contain less than three carbon atoms between the primary and secondary amino groups then there is little difference between the reactivity of the different amino groups and it is only a question of time before cross-linking takes place and the polyamine creases to be spinnable. This method cannot therefore in practice be used for the production of high molecular weight, linear polyamides for spinning.

It is also known to use aliphatic or aromatic monocarboxylic acids such as acetic acid or benzoic acid as polycondensation regulating agents. Furthermore, in British Patent Specification No. 1,065,363, it has been proposed to use dicarboxylic acids and monocarboxylic acids in addition to polyamines. It could be shown that special properties of the polyamides could be influenced in the desired manner by using suitable quantities of dicarboxylic acid and monocarboxylic acid. Although the polyamides obtained by this method are suitable for use as hardeners for epoxy resins, it is not possible to modify these compounds with the given proportions of monocarboxylic acid, dicarboxylic acid and lactam in such a way as to obtain high molecular weight, linear polyamides which could be spun; nor was this to be expected.

It has now been found that basic modified polyamides and products produced from them such as threads, films or fibres which can be dyed with reactive dyes to produce lightfast dyeings which are fast to perspiration, water and boiling washes, even if the products are dyed to deep colour tones, can be obtained by the polycondensation of polyamide-forming starting materials, in particular lactams, in the presence of aliphatic triamines of the formula $H_2N-(CH_2)_n-NH-(CH_2)_n-NH_2$ where $n = 2$ to 6, dicarboxylic acids and monocarboxylic acids if the reactants are used in proportions corresponding to 0.1 to 5.0 mol and preferably 1.0 to 2.0 mol of an aliphatic triamine of the above formula per 100 mol of polycondensable lactam and two equivalents of carboxyl groups in the form of dicarboxylic acids and monocarboxylic acids per mol of triamine and the molar ratio of monocarboxylic acids to dicarboxylic acids is between 10:1 and 1:20, preferably between 3:1 and 1:3.

This invention therefore relates to a process for the production of a basic modified polyamide by the polycondensation of a lactam or an ω-aminocarboxylic acid in the presence of a triamine of the formula $H_2N-(CH_2)_n-NH-(CH_2)_n-NH_2$ wherein n equals 2 to 6, a dicarboxylic acid and a monocarboxylic acid, which comprises adding to the reactive mixture 0.1 to 5.0 mol of the aliphatic triamine per 100 mol of polycondensable lactam and 2 equivalents of carboxyl groups in the form of dicarboxylic acids and monocarboxylic acids per mol of triamine and the molar ratio of said monocarboxylic acids to said dicarboxylic acids being between 10 : 1 and 1 : 20.

The process according to the invention for producing the basic modified polyamides which can be dyed with reactive dyes to produce lightfast dyeings which are fast to perspiration, water and boiling detergents even if the dyeings are in deep colour tones is carried out by the usual methods used for producing the corresponding unmodified polyamides, which consist of adding the modifying agents to the usual polyamide-forming lactams or ω-aminocarboxylic acids. The process is generally carried out by keeping the mixture of components in the given proportions in an autoclave at temperatures above 200°C and preferably at 250 to 275°C for 4 to 10 hours with exclusion of oxygen to effect polycondensation and then processing the resulting basic modified polyamide melts to produce shaped structures such as threads, films or firbres. The production of basic modified polyamides in accordance with the invention is not affected by the addition of pigments, stabilizers, brightening agents and similar substances but all the reactants must be able to withstand the given conditions of time and temperature without decomposition, for example the monocarboxylic and dicarboxylic acids used must not undergo decarboxylation.

The most suitable lactams for the polycondensation process are aliphatic lactams which contain up to 13 ring atoms such as γ-butyrolactam, δ-valerolactam, ε-caprolactam or ω-lauryl lactam and the corresponding ω-aminocarboxylic acids such as γ-aminobutyric acid, ε-aminocaproic acid or ω-aminodecanoic acid. ε-Caprolactam is particularly suitable for producing the polyamides according to the invention.

Diethylene triamine, 3,3'-diamino-dipropylamine, spermidine, 4,4'-diamino-dibutylamine and 6,6'-diaminodihexylamine are suitable aliphatic triamines for the process. The amines may be used as mixtures with each other but diethylene triamine is preferred.

It has been found that higher valent amines such as triethylene tetramine and tetraethylene pentamine may also be used.

The dicarboxylic acids used may be aliphatic, aromatic or cycloaliphatic, e.g. oxalic acid, succinic acid, glutaric acid, adipic acid, sebacic acid, decane-dicarboxylic acid, terephthalic acid, isophthalic acid or cyclohexane-1,4-dicarboxylic acid. It is particularly suitable to use aliphatic dicarboxylic acids which contain up to 10 methylene groups, adipic acid being preferred, but their polyamide-forming derivatives, e.g., their lower alkyl esters such as dimethyl or diethylesters may also be used.

The monocarboxylic acids used may be aliphatic, aromatic or cycloaliphatic, e.g., acetic acid, butyric acid, lauric acid, stearic acid, benzoic acid, benzoic acids substituted with alkyl, halogen or alkoxy groups, or cyclohexane carboxylic acid. Aromatic monocarboxylic acids are particularly suitable, benzoic acid being preferred.

To obtain a basic modified polyamide which can be dyed with reactive dyes to produce lightfast dyeings which are fast to perspiration, water and boiling detergents even in deep colour tones, the proportions in which the reactants are used is critical, for example it is essential to add 0.1 to 5.0 mol of aliphatic triamine to 100 mol of polycondensable lactam (corresponding to 50 to 440 mVal of amino groups per kg in the polyamide) and preferably 1.0 to 2.0 mol, and to use a quantity of monocarboxylic and dicarboxylic acids which correspond to 2 carboxyl equivalents to 1 mol of aliphatic triamine. In addition, the molar ratio of monocarboxylic acid to dicarboxylic acid must be between 1 : 10 and 1 : 20 and is preferably between 3 : 1 and 1 : 3.

A further object of this invention is the production of basic modified polyamides produced by the polycondensation of lactams or 107 -aminocarboxylic acids with 0.1 to 5 mol of triamines of the formula $H_2N—(CH_2)_n—NH—(CH_2)_n—NH_2$ (where n equals 2 to 6) per 100 mol of lactam and 2 equivalents of carboxyl groups in the form of dicarboxylic acids and monocarboxylic acids per mol of triamine, using a molar ratio of monocarboxylic acids to dicarboxylic acids of between 10 : 1 and 1 : 20, which polyamides are dyed with reactive dyes.

The basic modified polyamides produced according to the invention are eminently suitable for the production of threads, films or fibres and have relative solution viscosities, $\eta_{rel.}$, of between 2.4 and 3.1 and preferably between 2.6 and 2.8. To achieve the excellent dyeing properties, it is essential to add aliphatic triamines of the formula shown above in quantities preferably of 1.0 to 2.0 mol per 100 mol of polyamide forming lactam. The basic modified polyamides produced according to the invention then have amino group contents of between 120 mVal/kg and 220 mVal/kg.

The basic modified polyamides produced according to the invention contain, per 100 mol of the polyamide-forming lactam, 0.1 to 5.0 and preferably 1.0 to 2.0 recurrent structural units of the general formula

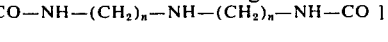

and/or the formula

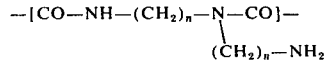

which are capable of reacting with the reactive groups of reactive dyes to form recurrent structural units of the general formula

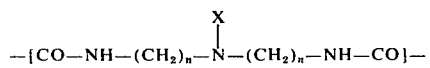

and/or the formula

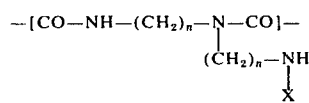

in which $n = 2$ to 6 and X represents the reactive dye radical (reactive dye without the group which is splitted off).

The reactive dyes used for dyeing the polyamides produced according to the invention and the threads and fibres produced from them are preferably water-soluble dyes of the azo, anthraquinone or phthalocyanine series containing 1 to 4 sulpho groups. These dyes must contain at least one group which is capable of reacting with the fibres, for example the monochlorotriazinyl-, dichlorotriazinyl-, dichloroquinoxalinyl-, trichloropyrimidinyl-, difluoro-chloropyrimidinyl-, methylsulphonyl-benzothiazolyl-, ethylsulphonyl-benzothiazolyl, methylsulphonyl-pyrimidinyl-, 4-sulphonamido-benzylchloride-, α-bromoacrylamide-, vinyl sulphone- or β-hydroxyethyl-sulphuric acid semiester group.

The reactive dye group X is therefore preferably one which corresponds to one of the following formulae:

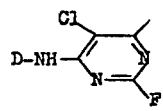 1)

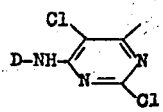 2)

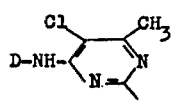 3)

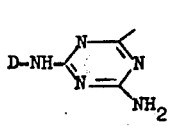 4)

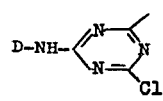 5)

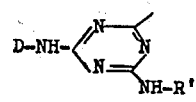 6)

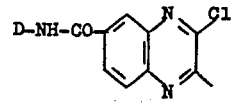 7)

D—NH—CO—CH₂—CH₂— 8)

or

D—SO₂—CH₂—CH₂—, 9)

in which
D represents a dye group from the series of azo, anthraquinone or phthalocyanine dyes and
R' represents a phenyl group which may contain sulpho groups.

The dyes used for dyeing the basic modified polyamides and therefore those corresponding to the following formulae:

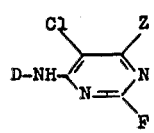 10)

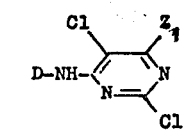 11)

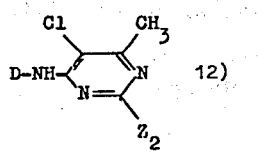 12)

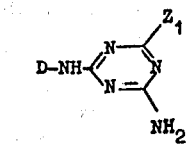 13)

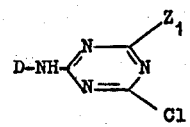 14)

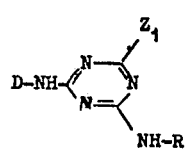 15)

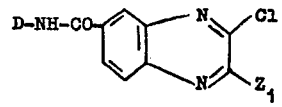 16)

D—NH—CO—CH=CH₂ (17)

or

D—SO₂—CH=CH₂ (18)

in which
D represents a dye group from the series of azo, anthraquinone or phthalocyanine dyes,
Z = Cl or F,
$Z_1$ = Cl,
$Z_2$ = SO₂—CH₃ and
R' represents a phenyl group which may contain sulpho groups. Dyes of this kind which contain at least one group capable of reacting with fibre materials which contain NH groups and at least one sulphonic acid group have been described in the following publications:
Angewandte Chemie 1961, page 125 – 136;
Angewandte Chemie, 1964, page 423–431;
American Dyestuffs Reporter 1961, page 505 – 515;
Dyer 1963, page 891 - 892; 1964, page 31 – 37;
SVF-Fachorgan 1964, page 116 – 123;
Melliand Textilberichte 1967, page 693 – 696;
Izv. vyssich uc. Zav. Technol. tekstil. Prom. 1966, page 102 – 107;
Melliand Textilberichte 1968, 1313 – 1321;
Melliand Textilberichte 1968, page 1444 – 1448;

Kolloidzeitschrift und Zeitschrift fur Polymere 1968, Volume 1, page 1 – 10;
Textilveredlung 1968, page 241 – 247;
Textile Chemist and Colorist 1969, page 182 –189;
Textil-Praxis 1971, page 241 – 245;
Textil Research J. 1971, page 518 –525;
Textil Praxis 1971, page 499 – 504;
German Patent Specifications No. 578,742; 578,933; 614,375; 614,896; 650,328;
German Offenlegungsschrift No. 1,469,778;
Belgian Patent Specifications No. 563,200; 578,742; 578,933; 614,375; 614,896; 619,731; 650,328; 703,598; 732,232;
British Patent Specifications No. 844,869; 844,870; 882,001; 893,976; 995,261;
French Patent Specifications No. 1,143,179; 1,143,180; 1,182,006; 1,207,778; 1,217,738; 1,271,328; 1,282,228; 1,318,843; 1,323,029; 1,352,295; 1,427,781; 1,466,567; 1,472,770 and Swiss Patent Specification No. 364,062.

The following are examples of such reactive dyes:

Dyeing and printing of the basic modified polyamides produced according to the invention is generally carried out by applying the dyes to the threads, fibres or films or in some cases the granulate produced from the polyamides, and this application may be carried out in the presence of sodium sulphate and a commercial wetting, levelling or dispersing agent, using a slightly acid to slightly alkaline dye bath or slightly acid or slightly alkaline printing pastes at a pH of from 3.0 to 9.0, preferably 4.5 to 6. To improve the levelling and the quantity of dye fixed, it may be advantageous to change the pH of the dye bath during the dyeing process, i.e., to start the dyeing process in a slightly acid medium at pH 3 to 5 and then to accelerate and terminate the reaction between the reactive group of the dye and the amino or imino groups of the polyamide by raising the pH to 7–9 when the bath has become exhausted due to the anionic dye being absorbed by the basic polyamide salt formation. In the case of printed or pad-dyed textile fabrics or foils, the dyeing process is generally a process of extraction carried out at 40° to 100°C or of steaming at 100° to 102°C.

Under these conditions, the mobile, replaceable Cl, $CH_3-SO_2$ and F groups referred to as labile groups Z which are attached to the reactive groups are either split off from the dye molecule and replaced by the amino or imino group of the basic modified polyamides or the addition of an activated unsaturated carbon-carbon bond to the amino or imino group of the basic modified polyamides takes place. The linkage between the basic modified polyamides and the reactive dyes which is obtained by the formation of a covalent bond naturally occurs not only on the modifying component but also on the normal end groups of the polyamide. The dyed polyamides obtained in this way preferably contain from 0.1 to 0.5 mol of reactive dye for each mol of triamine contained in the basic modified polyamide, which corresponds to 20 – 100 mmol of reactive dye per kg of basic modified polyamide. It is possible in this way to obtain basic modified polyamides which can be dyed to deep colours with reactive dyes and in which dyeings of medium and deep tones are much more fast to perspiration, water and boiling detergents than in known polyamide materials obtained by the usual processes, for example by the polymerisation of ε-caprolactam.

Furthermore, the dyeings obtained are distinguished by their excellent lightfastness and the ability to be produced with a richness of colour which will satisfy the most stringent requirements. Dyed polyamides which are consistently superior in the fastness of their colours to perspiration, water and boiling detergents can therefore be obtained in the brilliant, full colour tones which could previously only be obtained on cellulose fibres and wool.

Mixtures of cellulose fibres such as cotton or rayon and fibres of polyamides produced according to the invention can be dyed tone-in-tone with reactive dyes to produce deep colours which are very fast to boiling detergents. In fibres produced from previously known polyamides, on the other hand, the colours obtained by dyeing with reactive dyes are fast to boiling detergents only if they are light in tone and it has therefore not previously been possible to obtain deep tones fast to boiling detergents on mixtures of polyamide and cellulose fibres.

The high dye fixing capacity of fibres and threads spun from basic modified polyamides produced according to the invention also makes it possible to produce multicolour effects by a single bath treatment on mixed fabrics woven or knitted from a mixture of conventional polyamides and basic modified polyamides produced by the process according to the invention.

The relative solution viscosities $\eta_{rel.}$ given in the following examples were determined in an Ubbelohde viscosimeter at 25°C, using solutions of 10 g of substance in 1 l of m-cresol.

Determination of the amino groups was carried out by potentiometric titration in a solvent mixture of phenol/chloroform (7:3) against N/10 perchloric acid in glacial acetic acid.

The melting points were determined by differential thermoanalysis.

The sulphur content of the dyed polyamides was determined by the method of Grote-Krekeler by which the material is burned in air and the combustion gas is introduced into a 3% solution of hydrogenperoxide. The sulphur content is determined as usual gravimetrically as barium sulphate.

All parts and percentages refer to weight unless otherwise indicated.

The following examples are to further illustrate the invention without limiting it.

EXAMPLE 1

3575 Parts of E-caprolactam, 127 parts of E-aminocaproic acid, 32.5 parts of diethylene triamine, 33 parts of adipic acid and 23.5 parts of benzoic acid are heated to 260°C for 3 hours under an atmosphere of oxygen free nitrogen without the application of pressure. The mixture is then polycondensed by heating for 4 hours at this temperature with stirring. About 29 parts of water are split off, which is equal to the theoretically calculated quantity. The polycondensate obtained is then spun in water to form a bristle (diameter approximately 2.3 to 2.6 mm) which is granulated and freed from monomeric and oligomeric constituents by boiling with oxygen-free distilled water.

3125 Parts of basic modified polyamide-6 with a relative solution viscosity $\eta_{rel.}$ of 2.64 and an amino group content of 128 mVal/kg are obtained after drying. The polyamide is then spun in a spinning extruder in known manner at 280°C to form dtex 50 f 9 endless filaments.

100 Parts of the basic modified polycaprolactam obtained in this way are introduced into a dyeing apparatus as an endless filament wound on a spool, and a dye bath consisting of 6 parts of the dye of formula I, 0.5 parts of triethanolamine dodecylbenzene sulphonate of the following formula

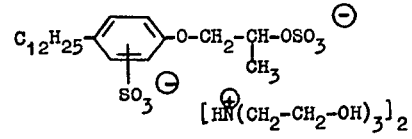

10 parts of anhydrous sodium sulphate,
3 parts of 60% acetic acid and
2000 parts of water is then added at 25°C.

The dye bath was stirred vigorously while heated to 60°C over a period of 20 minutes and is then heated to 100°C for 20 minutes and finally kept at this temperature for 60 minutes. The dye bath is then made slightly alkaline by the addition of 3 parts of anhydrous soda and kept at 100°C for 15 minutes. The dye bath is then discharged and a fresh dye bath consisting of 2,000 parts of water and 1 part of Mersolat H is introduced into the apparatus. The dye bath is kept vigorously circulated while heated to 100°C for 20 minutes and is then left at this temperature for 5 minutes. The dye bath is then discharged and the package on the spool is dried. A deep red colour which is very fast to washing and perspiration is obtained.

The sulphur content amounts to 0.29% which corresponds to a pure dyestuff content of 45.5 mmol per kg of the basic modified polyamide.

If the dyeing process is carried out in the same manner on an ordinary commercial polycaprolactam endless filament instead of the basic modified polycaprolactam material, the dye bath is only partly exhausted and the red colour obtained is comparatively pale and only moderately fast to washing and perspiration.

If instead of the basic modified polycaprolactam endless material, equal parts of the polycaprolactam endless material described in German Auslegeschrift No. 1,223,100 are used, the dye bath is again substantially exhausted but the quantity of dye fixed by the material is only slightly greater than that fixed by the conventional polycaprolactam endless material and the fastness to washing and perspiration is therefore poor.

The extraction and fixing of the dye of formula I on the three various fibre materials is represented by the extraction curves and fixing curves in FIG. 1 in which $A_1$ represents the total quantity of dye extracted by ordinary polycaprolactam which has not been modified with basic groups, $A_2$ represents the quantity of dye which remains fixed in ordinary polycaprolactam not modified with basic groups after it has been treated with soap, $B_1$ represents the total quantity of dye extracted by polycaprolactam which has been modified by the incorporation of tertiary amino groups, $B_2$ represents the quantity of dye which remains fixed in polycaprolactam modified by the incorporation of tertiary amino groups after it has been treated with soap, $C_1$ represents the total amount of dye extracted by polycaprolactam which has been modified with basic groups in accordance with the invention, $C_2$ represents the amount of dye which remains fixed in polycaprolactam modified with basic groups according to the invention after it has been treated with soap.

To obtain these curves, six dyeing processes are carried out side by side, and one is stopped after 10 minutes and the others after 20, 30, 40, 70 and 100 minutes respectively. Extinction of the dye liquor is determined at these points in time and at the beginning of the dyeing process and the extinction values are calculated in percent of the initial extinction of the dye bath at time $t = 0$. The percentages obtained are subtracted from 100 and the differences are plotted as extraction values in percent at 10, 20, 30, 40, 70 and 100 minutes. 100 Parts of the dyeings are removed after 10 minutes and after 20, 30, 40, 70 and 100 minutes respectively and in each case treated twice with a solution of 2 parts of anhydrous soda in 2,000 parts of water at 100°C for 15 minutes and the extinction of the combined aftertreatment liquors is determined in each case.

The extinction values obtained in percent of the initial extinction of the dye bath at time $t = 0$ are converted to equal dilution ratios are subtracted from the extraction values, and the differences are plotted as quantities of dye fixed.

If instead of the dye of formula I equal parts of the dye of formula II or of formula III or IV are used, deep red dyeings which are very fast to washing and perspiration are again obtained on the basic modified polycaprolactam endless material. The sulphur content amounts to 0.24%, 0.33% and 0.28% respectively which corresponds to a pure dyestuff content of 25 mmol, 34.4 mmol and 30 mmol/kg of the basic modified polyamide. If the dyeing process is then again carried out in the same manner but the basic modified polycaprolactam endless material is replaced by equal parts of an ordinary commercial polycaprolactam endless material, only partly exhausted dye baths are obtained in each case and comparatively pale, light red dyeings which are only moderately fast to washing and perspiration.

If instead of the basic modified polycaprolactam endless material, equal parts of the polycaprolactam endless material with tertiary amino groups described in German Auslegeschrift No. 1,223,100 are used, the dye baths are substantially exhausted but the quantity of dye fixed is only slightly higher than the quantity fixed by ordinary polycaprolactam endless material and the fastness to washing and perspiration is therefore low.

EXAMPLES 2 – 10

Polycondensations are carried out in a manner similar to that described in Example 1 but using the quantities shown in Table 1. Table 2 shows the chemical and physical properties of the basic modified polyamides obtained in these examples. Examples 2 and 5 in which no monocarboxylic acid was used are given for comparison purposes. The relative viscosities obtained in these examples show that the products obtained are unsuitable for spinning.

Table 1
(Starting materials in mols)

| Examples | 2 | 3 | 4 | 5 | 6 | 7 | 8 | 9 | 10 |
|---|---|---|---|---|---|---|---|---|---|
| ε-caprolactam | 97 | 97 | 97 | 97 | 97 | 97 | 97 | 97 | 97 |
| ε-aminocaproic acid | 3 | 3 | 3 | 3 | 3 | 3 | 3 | 3 | 3 |
| Diethylene-triamine | 1 | 1 | 1 | 2 | 2 | 2 | 2 | 0.5 | 4 |
| Adipic acid | 1 | 0.8 | 0.6 | 2 | 1.9 | 1.7 | 1.5 | 0.4 | 3.7 |
| Benzoic acid | 0 | 0.4 | 0.8 | 0 | 0.2 | 0.6 | 1.0 | 0.2 | 0.6 |

Table 2
(Properties of the polyamides)

| Examples | 2 | 3 | 4 | 5 | 6 | 7 | 8 | 9 | 10 |
|---|---|---|---|---|---|---|---|---|---|
| Melting point °C | 219 | 219 | 218 | 217 | 217 | 217 | 216 | 221 | 212 |
| Viscosity $\eta_{rel.}$ | 3.40 | 2.95 | 2.40 | 3.30 | 3.10 | 2.75 | 2.42 | 3.05 | 2.86 |

-continued

Table 1
(Starting materials in mols)

| Examples | 2 | 3 | 4 | 5 | 6 | 7 | 8 | 9 | 10 |
|---|---|---|---|---|---|---|---|---|---|
| Amino group content mVal/kg | 108 | 120 | 135 | 178 | 182 | 185 | 220 | 75 | 360 |

100 Parts of the basic modified polycaprolactam described in Example 7 are introduced in the form of a knitted material into a dye vat and a dye liquor consisting of 5 parts of the dye of formula V, 4 parts of sodium naphthalene-1,3,5,7-tetrasulphonate, 5 parts of anhydrous sodium sulphonate, 3 parts of 60% acetic acid and 3000 parts of water is added at 25°C.

The liquor is heated to 60°C over a period of 20 minutes while the material is kept in motion and it is then heated to 100°C over a period of a further 20 minutes and then kept at this temperature for 60 minutes. The dye bath is then made slightly alkaline by the addition of 3 parts of anhydrous soda and kept at 100°C for 15 minutes. The liquor is then discharged and the vat filled with fresh liquor consisting of 3000 parts of water 1 part of Mersolat H. This is heated to 100°C over a period of 20 minutes and then left at this temperature for 5 minutes while the material is evenly moved through the liquor. The liquor is then discharged and the material dried. A deep blue dyeing which is very fast to washing and perspiration is obtained. The sulphur content amounts to 0.26% which corresponds to a pure dyestuff content of 40.4 mmol of the basic modified polyamide.

If instead of the dye of formula V equal parts of the dye of formula VI, or formula VII or VIII are used, the dyeings obtained on the polycaprolactam produced according to Example 7 are again deep blue and very fast to washing and perspiration. The sulphur content amounts to 0.32%, 0.39% and 0.27% respectively which corresponds to a pure dyestuff content of 49.4 mmol, 40.5 mmol and 43.0 mmol per kg of basic modified polyamide.

If the dyeing process is again carried out in the same manner but the basic modified polycaprolactam endless material described in Example 7 is replaced by equal parts of an ordinary commercial polycaprolactam endless material, the dye bath is only partly exhausted and a comparatively pale blue dyeing with only moderate fastness to washing and perspiration is obtained.

If instead of the basic modified polycaprolactam endless material described in Example 7 equal parts of the polycaprolactam endless material which contains tertiary amino groups described in German Auslegeschrift No. 1,223,100 are used, the dye bath is substantially exhausted but the dyeing obtained is considerably inferior in its fastness to washing and perspiration than that obtained on the polycaprolactam endless material produced according to Example 7.

Dyeings obtained by reactive dyestuffs using the polyamides of Examples 3, 4, 6 and 8 to 10 yield in similar deep dyed polyamides as in Example 7, and they show also good fastness.

EXAMPLE 11

3685 Parts of ε-caprolactam, 67.2 parts of diethylene triamine, 85.6 parts of adipic acid, 15.9 parts of benzoic acid, 12.6 parts of TiO₂ and 110.6 parts of water are introduced into a 10 l VA stirr autoclave which has been washed with oxygen-free nitrogen, and the reaction mixture is heated to 260°C over a period of 3 hours, during which time a pressure of about 9 atmospheres builds up. When the polymerisation temperature is reached, stirring is continued for one hour under pressure and the pressure is then carefully released from the autoclave over a period of 2 hours. Most of the water introduced with the reaction mixture distils off in the process. Condensation is then continued for 2 hours at this temperature under a stream of oxygen-free nitrogen and at the same time the water of reaction formed is removed. The total quantity of water obtained is about 150 parts. After one hour's stirring, the polycondensate obtained is spun in the form of a bristle by forcing it into water under a pressure of 5 atmospheres of oxygen-free nitrogen and the bristle is then granulated and extracted.

3635 Parts of basic modified polyamide-6 with a relative solution viscosity $\eta_{rel.}$ of 2.59 and an amino group content of 216 mVal/kg are obtained after drying. The polyamide-6 is then formed into an endless material in known manner.

100 parts of the so obtained basic modified polycaprolactam are introduced into a dye vat in the form of fibre yarn and a dye liquor consisting of 8 parts of the dye of Formula IX, 1 part of triethanolamine dodecylbenzene sulphonate of the formula

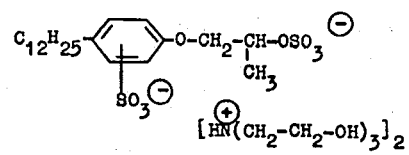

5 parts of anhydrous sodium sulphate, 3 parts of 60% acetic acid and 3000 parts of water, and heated to 30°C is added.

The liquor is kept in vigorous circulation and at the same time heated to 60°C over a period of 20 minutes and then to 100°C over a period of a further 20 minutes and then kept at this temperature for 60 minutes. The dye bath is then made slightly alkaline by the addition of 3 parts of anhydrous soda and kept at 100°C for 15 minutes. The liquor is then discharged and replaced by a fresh liquor consisting of 3000 parts of water and 1 part of Mersolat H.

The fresh liquor is heated to 100°C over a period of 20 minutes and then kept at this temperature for 5 minutes and at the same time vigorously agitated. The liquor is then discharged and the yarn dried. A deep yellow colour which is very fast to washing and perspiration is obtained.

The sulphur content of the dyed polyamide amounts to 0.48% which corresponds to a pure dyestuff content of 75.0 mmol/kg of the basic modified polyamide.

If the dye of formula IX is replaced by equal parts of the dye of formula X, a deep yellow colour which is very fast to washing and perspiration is again obtained on the polycaprolactam. The sulphur content of the dyed polyamide amounts to 0.42% which corresponds to a pure dyestuff content of 66.0 mmol/kg of the basic modified polyamide. If the dyeing process is then again carried out in the same way but using a commercial polyamide fibre yarn instead of the fibre yarn produced from the basic modified polycaprolactam described in Example 11, the dye bath is only partly exhausted and the yellow colour is comparatively weak and only moderately fast to washing and perspiration.

If instead of a fiber yarn produced from the basic modified polycaprolactam described in Example 11 equal parts of a fibre yarn of the polycaprolactam described in German Auslegeschrift No. 1,223,100 are used, the dye bath is substantially exhausted but the colour obtained is substantially less fast to washing and perspiration than the colour obtained on the polycaprolactam produced according to Example 11.

EXAMPLE 12

1228 Parts of E-caprolactam are polycondensed under pressure with 11.2 parts of diethylene triamine, 17.5 parts of sebacic acid, 5.5 parts of cyclohexanecarboxylic acid and 37 parts of water by the method described in Example 11. The solution viscosity $\eta_{rel.}$ of the resulting basic modified polyamide is 2.89 and the amino group content 115 mVal/kg.

EXAMPLE 13

1228 Parts of E-caprolactam are polycondensed under pressure with 21.2 parts of 3,3'-diaminodipropylamine, 19 parts of adipic acid and 3.9 parts of acetic acid in the presence of 37 parts of water by the method described in Example 11. The solution viscosity $\eta_{rel.}$ of the resulting basic modified polyamide is 2.75 and the amino group content 157 mVal/kg.

EXAMPLE 14

A knitted material obtained from the basic modified polycaprolactam of Example 11 was printed with a printing paste consisting of 50 parts of the dyestuff of formula VI, 50 parts of urea, 50 parts of 60% acetic acid, 320 parts of water, 500 parts of a thickener and 30 parts of sodium acetate.

The material is dried at 80°C for 1 minute and treated with steam 102°C for 30 minutes. Thereafter, 100 parts of the printed material is washed in an overflow with cold water for 3 minutes, soaped under boiling with 5,000 parts of a fresh liquor consisting of 2 parts of soda in 998 parts of water, for 10 minutes washed with cold water and neutralised with a solution consisting of 2 parts of 30% acetic acid and 998 parts of water. The printed areas of the material are of deep blue colour whereas the not printed areas remain pure white. The obtained print is fast to boiling washes and perspiration. The sulphur content of the dyed polyamide amounts to 0.53% which corresponds to a pure dyestuff content of 82.7 mmol/kg of the basic modified polyamide.

If instead of the basic modified polycaprolactam described in Example 11 an unmodified polycaprolactam is used, only a slight print is obtained.

EXAMPLE 15

100 Parts of the basic modified polycaprolactam described in Example 4 are introduced into a dyeing apparatus in the form of granules measuring about 2 to 3 mm in diameter, and a dye liquor consisting of 3 parts of the dye of formula VI, 0.5 parts of triethanolamine dodecylbenzene sulphonate of the formula

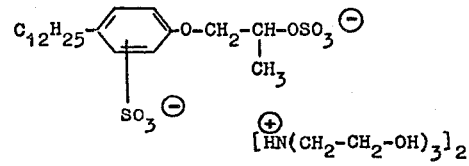

10 parts of anhydrous sodium sulphate, 3 parts of 60% acetic acid and 2000 parts of water, is added at 25°C.

The liquor is heated to 60°C over a period of 20 minutes and at the same time vigorously agitated, then heated to 100°C over a period of 20 minutes and finally kept at this temperature for 60 minutes. The dye bath is then made slightly alkaline by the addition of 3 parts of anhydrous soda and kept at 100°C for minutes. The liquor is then discharged and the apparatus filled with a fresh liquor consisting of 2,000 parts of water and 1 part of Mersolat H. The liquor is vigorously circulated while heated to 100°C over a period of 20 minutes and then kept at this temperature for 5 minutes. It is then discharged and the granulate is dried. The deep blue granulate obtained is then spun in a spinning extruder in known manner at 240°C to form a deep blue endless bristle (diameter approximately 0.1 mm) which is very fast to washing and perspiration.

What we claim is:

1. Basic modified polyamides produced by the polycondensation of lactams of ω-aminocarboxylic acids together with 0.1 to 5 mol of triamines of the formula
$$H_2N - (CH_2)_n - NH - (CH_2)_n - NH_2$$
wherein $n$ equals 2 to 6, per 100 mol of lactam and 2 equivalents of carboxyl groups in the form of dicarboxylic acids and monocarboxylic acids per mol of triamine, the molar ratio of said monocarboxylic acids to said dicarboxylic acids being of between 10 : 1 and 1 : 20, and said basic modified polyamides, dyed with reactive dyes.

2. The basic modified polyamides dyed with reactive dyes according to claim 1, wherein the reactive dyes are water soluble reactive dyes.

3. The basic modified polyamides dyed with reactive dyes according to claim 2, wherein the water-soluble reactive dyes are dyes of the triazine, pyrimidine, quinoxaline, acrylamide or vinyl sulphone series.

4. The modified polyamides dyed with reactive dyes according to claim 3, wherein the reactive dyes are those of the formulae

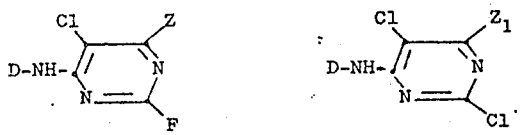

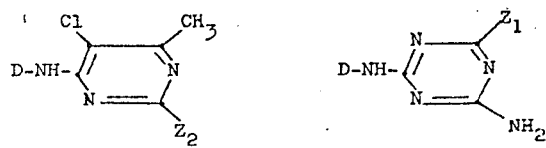

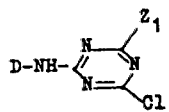, 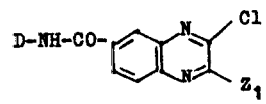
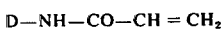
D—NH—CO—CH = CH₂
or
D—SO₂—CH = CH₂
wherein
D represents a dye group from the series of azo, anthraquinone or phthalocyanine dyes,
Z Cl or F
$Z_1$ Cl
$Z_2$ SO₂—CH₃ and
R' represents a phenyl group or a phenyl group containing sulpho groups.
5. Threads and fibers of polyamides according to claim 1.
* * * * *